(12) United States Patent
Ingbretsen

(10) Patent No.: US 12,721,284 B2
(45) Date of Patent: Sep. 1, 2026

(54) HAULING DEVICE HAVING COLLAPSIBLE HANDLE

(71) Applicant: William Douglas Ingbretsen, Columbia, SC (US)

(72) Inventor: William Douglas Ingbretsen, Columbia, SC (US)

( * ) Notice: Subject to any disclaimer, the term of this patent is extended or adjusted under 35 U.S.C. 154(b) by 971 days.

(21) Appl. No.: 18/049,068

(22) Filed: Oct. 24, 2022

(65) Prior Publication Data

US 2023/0247946 A1 Aug. 10, 2023

Related U.S. Application Data

(60) Provisional application No. 63/306,815, filed on Feb. 4, 2022.

(51) Int. Cl.
*A01G 20/43* (2018.01)

(52) U.S. Cl.
CPC .................................... *A01G 20/43* (2018.02)

(58) Field of Classification Search
CPC ...................................................... A01G 20/43
See application file for complete search history.

(56) References Cited

U.S. PATENT DOCUMENTS 3,722,023 A 3/1973 Gray
4,261,611 A * 4/1981 Barry ....................... B60J 7/141 296/100.1
4,434,829 A * 3/1984 Barnard .............. B65B 67/1238 383/41
4,561,480 A * 12/1985 Underwood ........... A01G 20/43 383/117
5,449,083 A 9/1995 Dougherty et al.
5,451,107 A * 9/1995 Ricker ...................... B65F 1/00 383/34
6,874,797 B2 4/2005 Gardenour
7,367,600 B1 5/2008 Lew et al.
7,984,733 B2 * 7/2011 Noonan .................... B65F 1/10 141/337
11,911,668 B2 * 2/2024 Lally .................... A63B 47/025
2007/0138453 A1 6/2007 Le
2007/0290464 A1 12/2007 Mastromatto et al.
2012/0267909 A1 10/2012 Sandel
2015/0251848 A1 9/2015 Sanders
2019/0352045 A1 11/2019 Ahumada

* cited by examiner

*Primary Examiner* — Brian O Peters
(74) *Attorney, Agent, or Firm* — JK Intellectual Property Law, PA

(57) ABSTRACT

A hauling device comprising a sheet of flexible material attached along an edge thereof to an adjustable, collapsible handle member. The handle member is preferably formed from two generally rigid handle bars that are pivotally engaged to one another at one end thereof, so that the handle member may be disposed in an open position, a closed position, or any desirable position therebetween. In the open position, the handle bars are disposed linearly (or in an offset linear configuration), in an end-to-end configuration, and in a closed position, the handle bars are disposed in parallel relation. The handle member may also be disposed in a position anywhere between the open and closed position, so that the handle bars form into a V-shape.

9 Claims, 5 Drawing Sheets

HAULING DEVICE HAVING COLLAPSIBLE HANDLE

CROSS REFERENCE TO RELATED APPLICATIONS

The present application is a non-provisional of U.S. Provision Application Ser. No. 63/306,815 entitled Collapsible Radial-Handle Hauling Device, filed on Feb. 4, 2022. The foregoing application is hereby incorporated by reference in its entirety.

FIELD OF THE INVENTION

The present invention is directed to a hauling device for hauling large volumes of light materials, such as tree leaves, pine needles, lawn clippings, twigs, small branches and other types of debris. More specifically, the present invention includes a hauling device having a sheet of flexible material, such as a tarpaulin or the like, which is attached to an adjustable, collapsible handle disposed along a front edge thereof.

BACKGROUND OF THE INVENTION

Wheelbarrows and wheeled hand carts are not well-suited for hauling large amounts of light material or light material of substantial length. A sheet of flexible material is beneficial for hauling larger volumes of lighter materials such as tree leaves and needles, lawn clippings, twigs and small branches and other types of debris or other materials which said sheet of flexible material can accommodate traveling upon horizontal or near-horizontal ground and man-made surfaces. Attempted solutions have been made to take advantage of the carrying and collection area a sheet of flexible material provides. However, there are many disadvantages to such proposed solutions. It would be desirable to provide a hauling device that increases the weight-handling capacity and is more efficient, navigable, and easier to use and to store.

Various types of hauling devices have been developed for this purpose. The following documents illustrate examples of these types of products, and are hereby incorporated herein by reference, in their entireties:

US Patent Publication Number 20070290464A1 Tarpaulin

A sliding tarp for hauling landscaping materials and debris is composed of a flexible, foldable rectangular sheet having attached to its underside a widthwise row of three elongated, relatively rigid convex glides disposed rearward of a location midway between the front and rear edges of the sheet and arranged so that the tarp can be folded along longitudinal fold lines extending between adjacent glides.

US Patent Publication Number 20120267909A1 Leaf Collecting and Hauling Tarpaulin A lawn tarpaulin of strong, flexible material for collecting and hauling leaves and lawn debris is described consisting of a rectangular tarpaulin with two or more weighted and partially stiffened edges. Both the weight and stiffening are provided by a plurality of strips of stiff dense material, such as metal strips, fastened to the tarp edges alternating with short gaps of flexible tarpaulin edge between them. This allows the tarpaulin to be folded for convenient storage. The weighted edges keep the tarpaulin from bowing in the wind and stable when raking debris onto the tarpaulin. A handle attached to one corner of the tarpaulin connects the opposite corner and to at least one central point on a front edge for hauling. The partially stiffened edges cause the tarpaulin to assume a shape while hauling that encloses the load and prevents spillage.

US Patent Publication Number 20070138453A1 Leaf Catching Device

A roll of nets are pre-treated or coated with attractive natural sticky glue gel is assembled on the roller device to lay down nets around the yard under tree and upright next by fence to catch fallen leaf and other lawn waste, and trap any small insects/mosquitoes. The nets roller device may use to retrieve netting with fallen leaves/debris on it to disposal or may reuse. The net may or may not be immediate turn to become "net bag" to waste fallen leaves/debris. The special tie loop can hold and tied up net bag. The special Guard Pins use to hold and secure the net to the ground/up right. The hollow core may use to contain all accessories in it.

US Patent Publication Number 20150251848A1 Leaf Bagging Equipment and Method

A leaf or lawn debris collecting and bagging assembly is made up of a rectangular flexible sheet (including a square configuration) configured with two handles as part of the sheet, which are connected to the four corners of the sheet and are used for the fast and easy conversion of the sheet into a bag thereby enclosing the leaves or lawn debris placed on the sheet in the converted bag.

US Patent Publication Number 20190352045A1 A-Z EZ Caddy

A foldable fabric lawn and indoor/outdoor caddy that opens with a flexible spring wire loaded frame when placed on the ground. Debris/material can be swept/raked into the invention via its flexible 27" rubber sweeping edge or by other means (shovel, hands, drop-cloth). The invention can then be closed together with its two handles and locked together for transport by the user. A rear fabric handle aides in the dumping/disposal of the aforementioned debris. The invention can then be placed on the ground ready for its next use. The invention can be used for clean-up, yard/garden work, as a drop-cloth, gather trash, and construction debris.

U.S. Pat. No. 7,367,600 Lawn Debris Handling System

A sheet has a long input edge and a short remote edge. The sheet has parallel side edges. The side edges extend at right angles from the ends of the input edge. Angled side edges extend from the ends of the remote edge to the ends of the parallel side edges. A pair of exterior fold lines extend from the ends of the remote edge. A pair of interior fold lines extend from intermediate regions of the remote edge parallel with the parallel side edges.

U.S. Pat. No. 5,449,083 Reusable and Collapsible Garden Container for Collecting and Transporting Loose Debris A reusable, durable, lawn and garden bagger for the easy collection and transportation of a quantity of loose debris such as leaves and grass clippings, for example. The bagger provides a collapsible container which provides an enlarged opening when secured in the fully open position, and where through loose debris is deposited with a garden tool such as a rake, for example. Handle means are provided at both ends of the container whereby a worker may pull the full container along the ground by the front handle means, and subsequently dump the debris from the container by lifting upwardly on the back handle means.

U.S. Pat. No. 6,874,797 Collapsible Refuse Collection Apparatus

A collapsible refuse collection apparatus. The invention includes a body; the body includes a frame portion and a covering portion having predetermined dimensions. The frame portion has an opened and closed position, two sides and a base; the two sides being adjacently and pivotally attached to the base. The covering portion is surroundedly attached to the frame portion, wherein the covering portion protects the frame portion and, in the frame portion's opened position, forms an inner compartment, a top, an opened end and a closed end. The apparatus also includes a wheel assembly attached to the frame portion providing mobility for the apparatus, a flap pivotally attached to the opened end of the covering portion and having predetermined dimensions. The inner compartment, formed by the frame portion's opened position, has predetermined dimensions such that the inner compartment can accommodate a collection bag. The inner compartment and the collection bag are used to collect the refuse. The sides pivot towards each other and fold towards the base, forming the frame portion's closed position.

U.S. Pat. No. 3,722,023 Leaf and Refuse Catcher

A collapsible basket-like catcher or carrier having bottom and side panels of mesh wire screen, the side panels being pivotally connected to the bottom panel, a pair of handles on said bottom panel, and locking means on said handles and side panels, whereby the side panels may be locked to each other in an upstanding position for collecting and carrying leaves and refuse or may be collapsed upon said bottom panel for storage.

SUMMARY OF THE INVENTION

In one embodiment, the present invention includes a hauling device comprising a sheet of flexible material attached along an edge thereof to an adjustable, collapsible handle member. The handle member is preferably formed from two generally rigid handle bars that are pivotally engaged to one another at one end thereof, so that the handle member may be disposed in an open position, a closed position, or any desirable position therebetween. In the open position, the handle bars are disposed generally linearly, in an end-to-end configuration (or in an offset linear configuration at about a 180 degree angle), and in a closed position, the handle bars are disposed in parallel relation. The handle member may also be disposed in a position anywhere between the open and closed position, so that the handle member is formed into a V-shape.

In one embodiment, the handle bars are connected to one another by a hinge member, which can take any desired form to perform the desired function. The handle bars are in pivoting relation, allowing one handle bar to rotate in the same plane or in a parallel plane with respect to the other handle bar, so that the handle member may be formed into a position at any desired angle.

In use, the handle bars may be positioned into a linear fashion, so that the flexible sheet and handle member may lay flat on the ground or any surface. A user may load yard debris, trash, or any other items onto the flexible sheet for transport. The handle bars may be positioned into a V-shape for loading and/or hauling, which distributes the load across the length of both handle bars, and allows for easier towing or pulling of the hauling device to another location. Alternatively, the handle member may be disposed in a closed position, where the handle bars are oriented in a parallel configuration, which allows a user to grasp the handle member with one hand for hauling. After use of the hauling device, the handle bars may be formed into the closed position (thus folding the flexible sheet in half), and rolled up into the flexible sheet for storage or transport.

BRIEF DESCRIPTION OF THE DRAWINGS

The drawings and specific descriptions of the drawings, as well as any specific or alternative embodiments discussed, are intended to be read in conjunction with the entirety of this disclosure. The assembly may, however, be embodied in many different forms and should not be construed as being limited to the embodiments set forth herein; rather, these embodiments are provided by way of illustration only and so that this disclosure will be thorough, complete and fully convey understanding to those skilled in the art.

FIG. 2 is a top view of one embodiment of a handle member, showing each handle bar attached to a hinge member in an open position;

DETAILED DESCRIPTION

Figure 1:
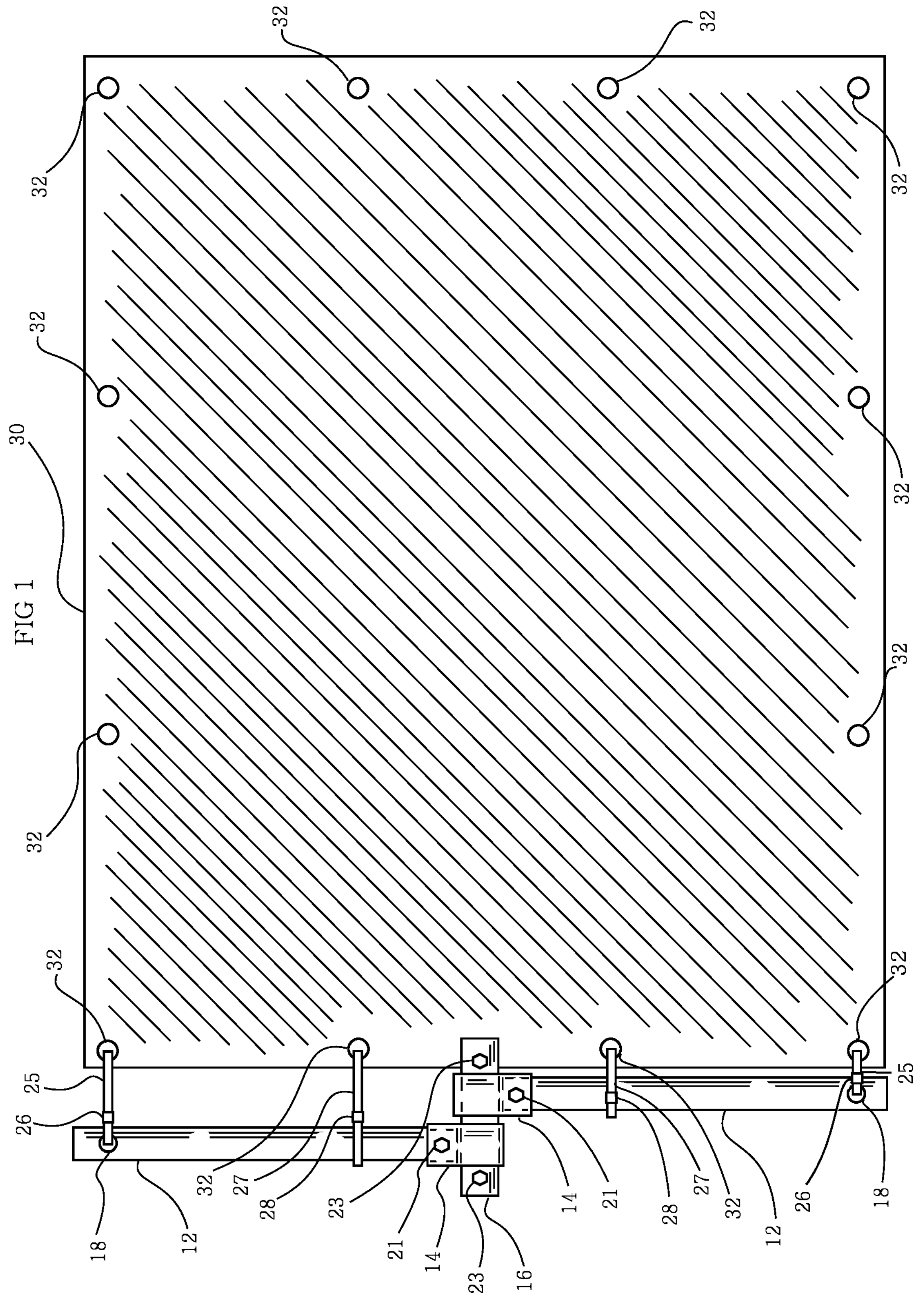
FIG. 1 is a top view of one embodiment of a handle member, showing the handle member disposed in an open linear configuration and sheet of flexible material (tarpaulin) spread flat.
Figure 2:
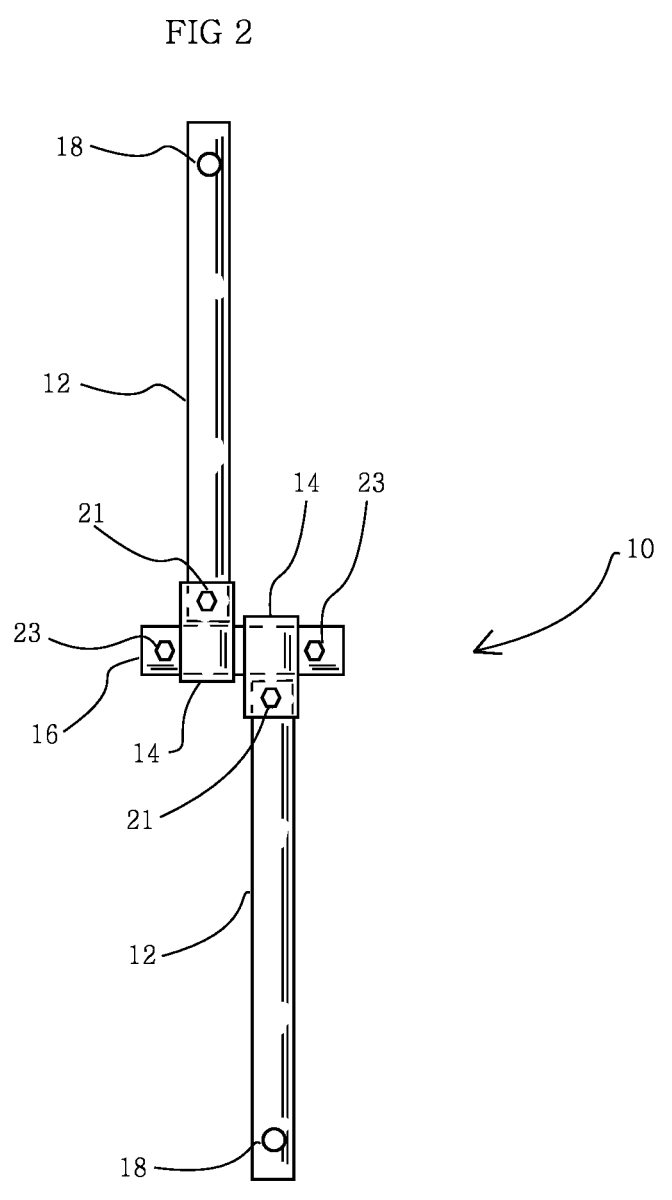
Figure 3:
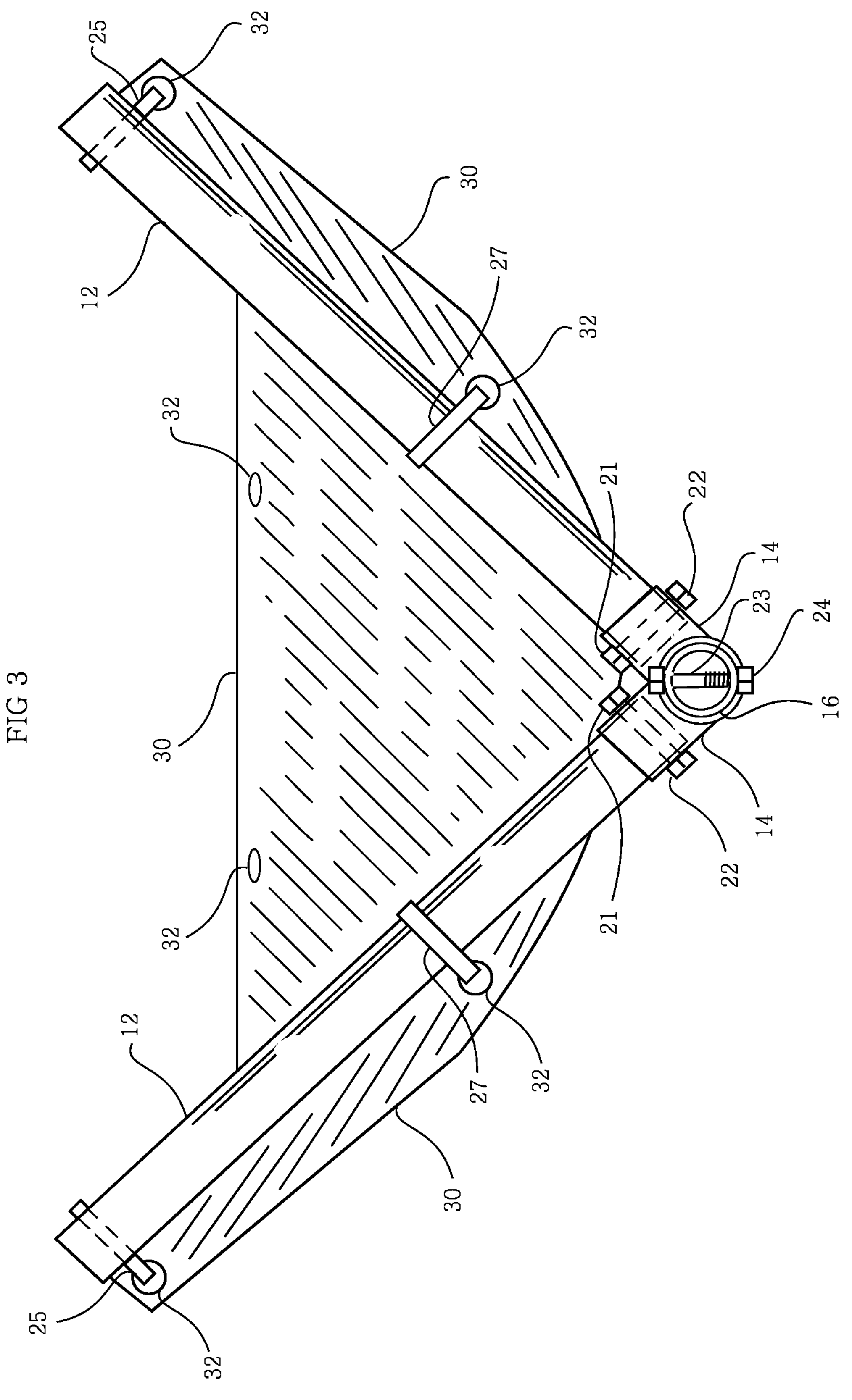
FIG. 3 is a front view of one embodiment of the hauling device with the handle member disposed in a partially closed position, wherein the handle member is formed into a V-shape and the sheet of flexible material (tarpaulin) attached thereto and deployed for collection and hauling.

In a first embodiment, the present invention includes a hauling device comprising a sheet of flexible material (also referred to herein as a 'tarpaulin') 30 attached along an edge thereof to an adjustable, collapsible handle member 10, as shown in FIG. 2. The handle member 10 is preferably formed from two rigid handle bars 12 that are pivotally engaged to one another by a hinge member at one end thereof, so that the handle member 10 may be disposed in an open position, a closed position, or any desirable position therebetween. In the open position, the handle bars 12 are disposed linearly (or in an offset linear configuration, as shown in FIG. 2), in an end-to-end configuration (shown in FIGS. 1-2), and in a closed position, the handle bars are disposed in parallel relation (shown in FIGS. 4-5). The handle member 10 may also be disposed in a position anywhere between the open and closed position, so that the handle member is formed into a V-shape (shown in FIG. 3).

The hauling device comprises, in one embodiment, a handle member 10 attached tightly or loosely, or continuously connected, to a first edge of a flexible sheet of material 30. The handle member 10 preferably comprises two handle bars 12 connected or interconnected to a hinge mechanism having an axis such that each handle bar 12 may rotate independently around the hinge axis on a parallel or near-parallel plane, or on the same plane. It should be understood that the handle member 10 may be manufactured in a variety of manners utilizing a variety of materials.

The handle member 10 is attached to the flexible sheet of material 30 in any desired or conventional manner. For instance, the handle bars 12 may include a series of holes 18 that preferably align with eyelets (or grommets) 32 positioned on the flexible sheet material (as commonly found on tarpaulins), and zip ties 25, cord, wire, carabiners, straps or other types of fastening means may be run through the holes 18 of the handle bars and grommets or holes 32 defined along an edge of the flexible sheet, as shown. Other attachment mechanisms may be used to attach the flexible sheet of material 30 to the handle member 10, including snaps, rivets, hook and loop fasteners, or the like.

The preferred embodiment of the invention consists of a handle member 10 (FIG. 2) attached tightly or loosely along one edge of a tarpaulin 30. The handle 10 is comprised of two handle bars 12, each preferably made from a polyvinyl chloride (PVC) pipe, one end of each inserted into a tee coupling 14 preferably made of PVC pipe. Each handle bar 12 is secured to each pipe tee coupling 14 by forming four in-line holes to allow hardware to pass through each handle bar 12 and each tee coupling 14, and inserting attaching screw 21, preferably a galvanized hex screw, through the holes and screwing an attaching nut 22 (FIG. 3), preferably a galvanized nut with nylon inserts, onto the threads of the attaching screw 21 firmly against the tee coupling 14 surface.

In one embodiment, the aforementioned handle and hinge assemblies are placed end to end and alongside another such that the vacant areas of the tee couplings 14 are in-line and adjacent such that axis bar 16, preferably made of PVC pipe, may pass through both tee couplings. Axis bar 16 is passed through and marked for forming of two in-line holes on opposing ends of axis bar 16, one each adjacent to each tee coupling 14 such that insertion of retaining screw 23, a galvanized hex screw, and retaining nut 24 (FIG. 3), a galvanized nut with nylon inserts, will be touching or very near each tee coupling 14 allowing for free movement of each tee coupling 14. Holes are formed and retaining screw 23 is passed through each hole and retaining nut 24 (FIG. 3) is screwed onto threads of retaining screw 23 firmly against axis bar 16 surface.

The front or leading edge of tarpaulin 30, with a plurality of eyelets 32 reinforced opened and placed alongside the leading edge of tarpaulin 30. A securing strap hole 18 is formed through each handle bar 12 in a location adjacent to each outermost eyelet 32.

In one embodiment, a securing strap 25, a nylon cable tie (also referred herein as a 'zip tie'), is passed through each securing strap hole 18 and the two outermost eyelets 32 and the tail is then fed through the head 26 of the securing strap 25 until slack is taken out of securing strap 25, preferably without having the tarpaulin 30 make contact with the handle member 10; rather each, the tarpaulin 30 and handle member 10, positioned along the breadth of one another, in parallel. The excess tail fed through the head 26 may be removed by cutting or other means.

In one embodiment, a sliding strap 27, preferably a nylon cable tie, is passed through the other eyelets 32 along the leading edge and fed around the handle bar 12 and the tail is then fed through the head 28 of the sliding strap 27 until slack is taken out of the sliding strap 27, preferably without having the tarpaulin 30 make contact with the radial handle 10; rather each, the tarpaulin 30 and radial handle 10, are positioned along the breadth of one another, in parallel. The excess tail fed through the head 26 may be removed by cutting or other means.

It should be understood that the flexible sheet of material 30 may be formed from any suitable material, such as canvas or any other materials commonly used to make tarpaulins or the like. Additionally, although a specific type of hinge member has been described hereinabove for allowing the handle bars 12 to pivot with respect to one another, other types of hinges or pivoting mechanisms may be employed to the same effect. In a preferred embodiment, the flexible sheet of material 30 may be formed into the shape of a square or rectangle having four sides, but it is contemplated that the sheet of flexible material 30 may be formed into other shapes, as desired. It is also contemplated that the sheet of flexible material 30 may be removably attached to the handle member 10 in any suitable fashion, so that the sheet 30 or the handle member 10 may be removed and/or replaced after sufficient wear and tear.

Further, the handle members themselves may be made from any type of suitable material, such as PVC pipe or the like, so long as the material is sturdy enough and rigid enough to be used for hauling loads of debris and the like without significant deformation or breakage.

The hauling device with a collapsible handle member 10 is a most useful device, particularly when used by a single user, for transporting large amounts of debris, yard waste, grass clippings, branches, and the like. The handle bars 12 serve to distribute the pulling force across the entire front edge of the flexible sheet 30 or tarpaulin, thus extending the effective life of the flexible sheet 30, and allowing a single user to easily pull a heavier load. In use, a user may open the collapsible handle 10 by moving the two handle bars 12 away from one another until the handle bars 12 lie flat on a ground surface, and may then unfold and spread out the sheet of flexible material 30. Debris or other material may be placed onto the flexible sheet 30 for purposes of hauling the device and debris to another location. The collapsible handle 10 allows for a more ergonomic method of using and pulling the flexible sheet of material 30 for hauling debris and other items, and the handle bars 12 are much easier for a user to grasp than an edge or corner of the flexible sheet of material 30 alone.

Figure 4:
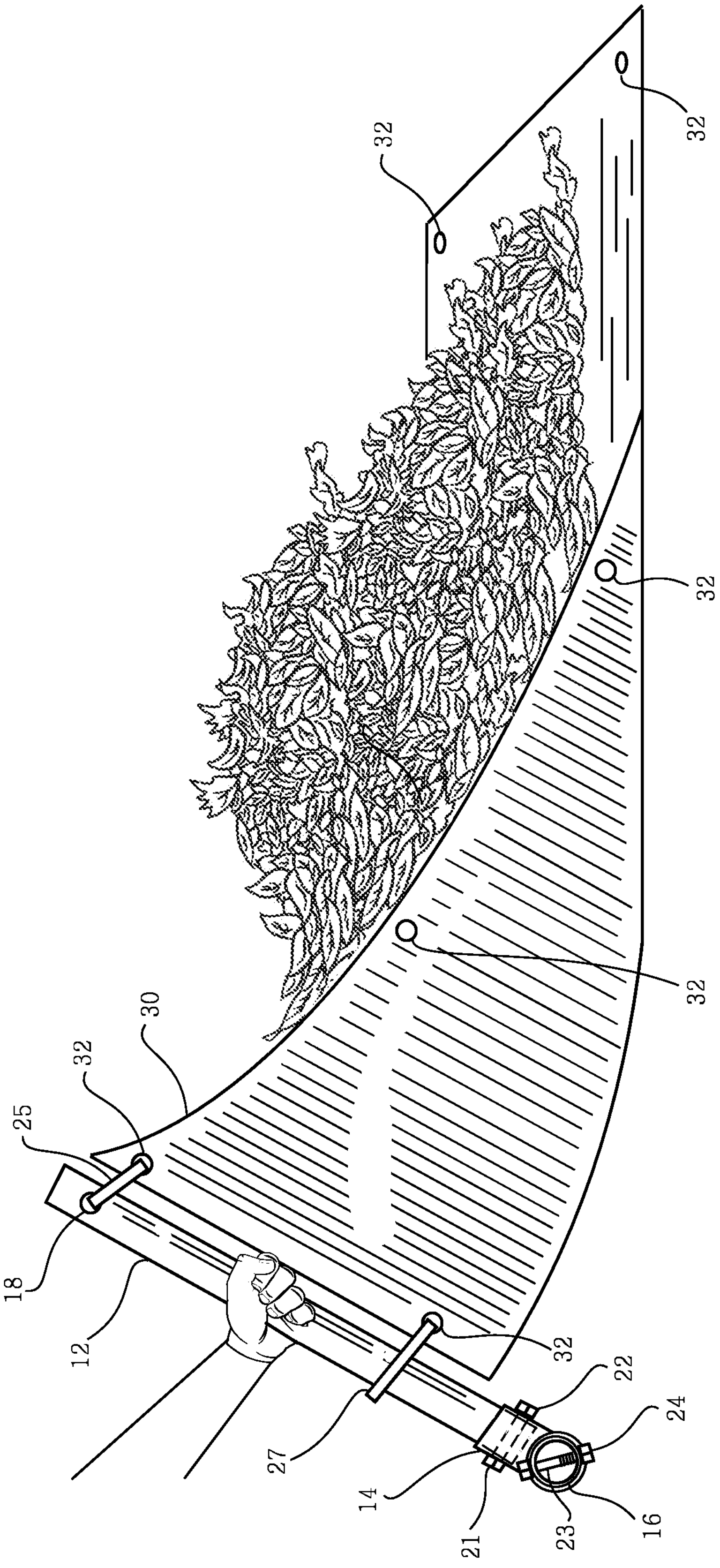
FIG. 4 is a side view of one embodiment of the hauling device shown in use with both handle bars disposed in a closed position wherein the handle bars are oriented in a parallel configuration for a single grasp of radial handle by user.
Figure 5:
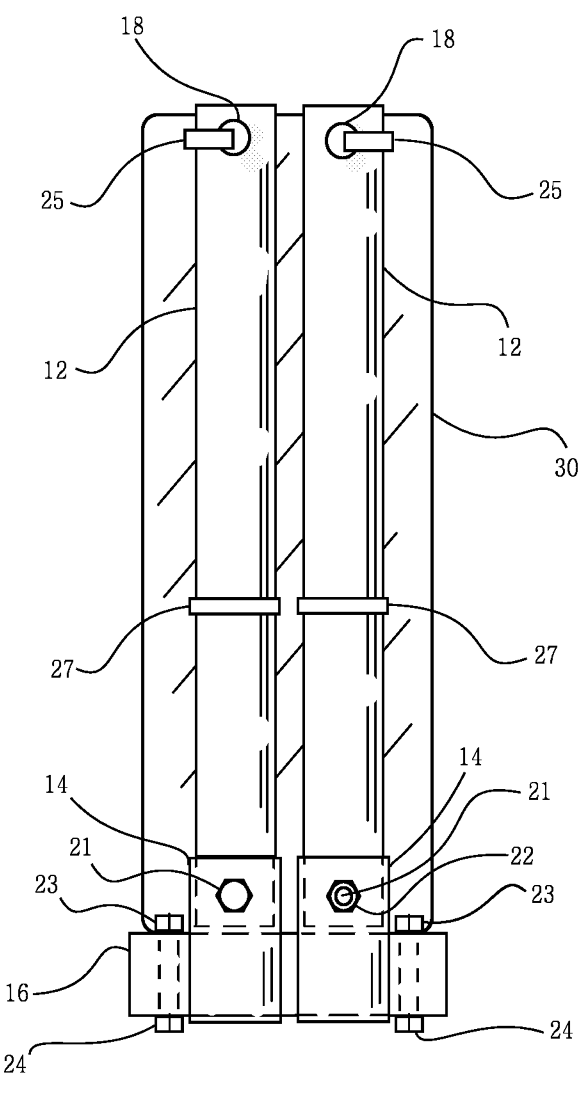
FIG. 5 is a side view of one embodiment of the hauling device with both handle bars disposed in a closed position wherein the handle bars are oriented in a parallel configuration, wherein the sheet of flexible material is compacted into a rolled or folded configuration for storage and/or transport.

Further, the collapsible handle 10 provides an improved means for gripping the assembly at any point along the front portion of the flexible sheet 30, so that a user may adjust his grip, and the position of his hands along the handle bars 12 based on the amount of weight or load on the flexible sheet 30, the strength of the user, or the leverage required to move the loaded assembly over hills, berms, or uneven terrain. Additionally, the handle bars 12 may be moved closer together, in order to navigate through tight spaces, such as spaces between trees, through gates, or through other types of tightly spaced obstacles. Furthermore, the hauling device may easily be used by two people, each of whom can grip one of the handle bars 12, especially for particularly heavy loads. Moreover, the handle bars 12 may be brought together while the flexible sheet is loaded with debris, as shown in FIG. 4, allowing a single user to grasp the handle bars while they are in parallel relation.

Optionally, in another embodiment, the handle member may be disposed on two opposed sides of the flexible sheet member, if desired. Additionally, a carrying strap may be attached, or removably attached to the handle member for transport purposes. Further, spikes, stakes or the like may be used to temporarily secure the flexible sheet member to the ground during windy conditions, or on steep or uneven terrain.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. A hauling device comprising:

a sheet of flexible material having a front edge, a rear edge, and side edges extending from the front edge to the rear edge, the sheet of flexible material defining front corners where the front edge meets the side edges and rear corners where the rear edge meets the side edges;

a handle assembly including a pair of handle bars and a hinge mechanism, a proximal end of each handle bar being attached to the hinge mechanism and a distal end of each handle bar extending away from the proximal end and the hinge mechanism, the handle bars being pivotable with respect to one another between an open position and a closed position via pivoting of the hinge mechanism, wherein the handle bars form an angle of about 180 degrees in the open position and wherein the distal ends are adjacent one another in the closed position, the handle assembly being attached to the sheet of flexible material via the handle bars at multiple locations only along the front edge and not along the side edges or the rear edge and with the hinge mechanism between the side edges, the flexible sheet of material and the handle assembly being cooperatively sized so that when the flexible sheet of material is laid out horizontally and the handle bars are moved from the open position to the closed position so that the hinge mechanism is at the bottom of the handle assembly and the distal ends point upwards the front corners are drawn upwardly together by the handle bars but the rear corners are not.

2. The hauling device set forth in claim 1, wherein said sheet of flexible material includes a series of eyelets about a periphery thereof including front eyelets along the front edge.

3. The hauling device set forth in claim 2, wherein attachment means are used to connect said handle bars to said sheet of flexible material so that said attachment means are disposed through said front eyelets.

4. The hauling device set forth in claim 3, wherein each eyelet includes a grommet.

5. The hauling device set forth in claim 3, wherein said attachment means are selected from the group consisting of zip ties, cord, wire, carabiners and straps.

6. The hauling device set forth in claim 1, wherein said hinge mechanism is formed from a pair of tee couplings that are rotatably connected to an axis bar.

7. The hauling device set forth in claim 1, wherein said hinge mechanism is formed by polyvinyl chloride pipe.

8. The hauling device set forth in claim 1, wherein said handle bars are formed from polyvinyl chloride pipe.

9. The hauling device set forth in claim 1, wherein said handle bars are disposed in parallel relation in said closed position.

* * * * *